United States Patent [19]

Jeschke et al.

[11] Patent Number: 4,606,633

[45] Date of Patent: Aug. 19, 1986

[54] TEST METHOD FOR EVALUATING FAULTS ON PRINTED SHEETS AND WEBS AND APPARATUS FOR PERFORMING THE METHOD

[75] Inventors: Willi Jeschke, Heidelberg; Gerhard Löffler, Weisenheim/Sand., both of Fed. Rep. of Germany

[73] Assignee: Heidelberger Druckmaschinen AG, Heidelberg, Fed. Rep. of Germany

[21] Appl. No.: 924,812

[22] Filed: Jul. 14, 1978

[30] Foreign Application Priority Data

Jul. 14, 1977 [DE] Fed. Rep. of Germany ..... 27318429

[51] Int. Cl.$^4$ .............................................. G01N 21/32

[52] U.S. Cl. ........................... 356/237; 101/DIG. 12; 250/572; 356/445

[58] Field of Search ............... 356/400, 401, 445, 448, 356/235; 250/562, 572; 101/DIG. 12

[56] References Cited

U.S. PATENT DOCUMENTS 3,634,012 1/1972 Mustert .......................... 250/562 X
3,658,430 4/1972 Rashkin .......................... 356/401 X
4,003,660 1/1977 Christie, Jr. et al. ........... 356/416 X

*Primary Examiner*—William L. Sikes
*Attorney, Agent, or Firm*—Herbert L. Lerner; Laurence A. Greenberg

[57] ABSTRACT

Method of evaluating faults on printed sheets by means of a reflectance meter and test fields which includes:

detecting by a measuring technique reflectance values of four test fields one of which is a full tone field and the other three are line screen test fields having screen lines disposed at varying angles yet exhibiting equal screen width and equal screen tone values in the film, mathematically determining the screen tone value in a print, deducting any effect of slip and mackling from the measured four reflectance values or from the screen tone values in the three line screen test fields ascertainable therefrom; and selectively indicating these values.

11 Claims, 4 Drawing Figures

Figure 1:
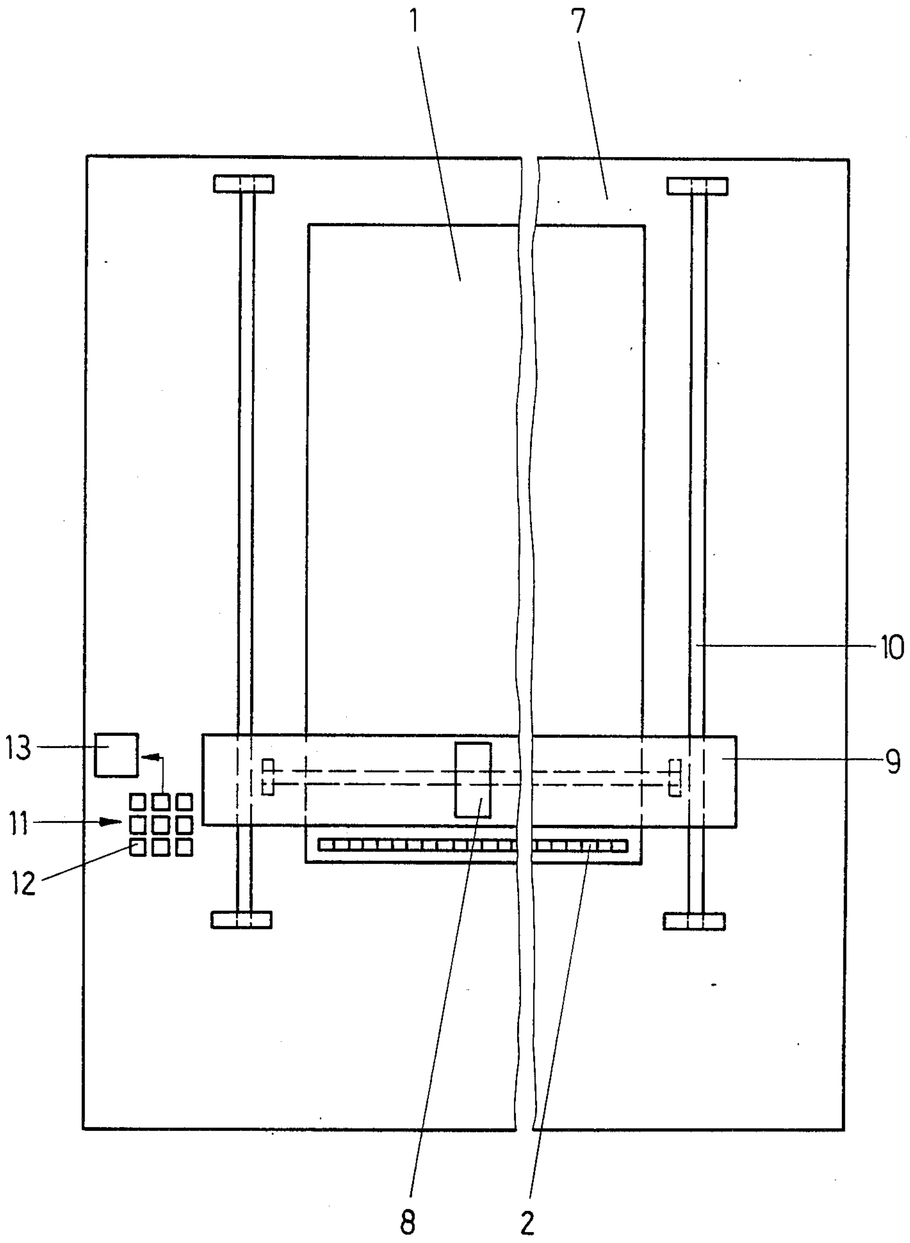

TEST METHOD FOR EVALUATING FAULTS ON PRINTED SHEETS AND WEBS AND APPARATUS FOR PERFORMING THE METHOD

The invention relates to a method of evaluating faults on printed sheets and webs, and more particularly such faults as slip and/or mackling, by means of a reflectance meter and of test fields, and also to an apparatus for performing said method. The term "sheets" as employed herein encompasses all kinds of virtually two-dimensional members having an extremely small third dimension in comparison with the other two dimensions thereof. They may be formed of any suitable material, such as paper, plastics, metal, woven fabric or the like.

In the offset printing process, two parameters amongst others play a part in deciding tone value reproduction; one is the full tone ink density and the other is the screen tone ink density. Of these, the screen tone ink density is the most significant factor in tone value reproduction of a screened image. Variation in size of the screen dots in printing as a result of process influences, for example due to a variation in the tackiness of the printing ink, due to a variation in the printed material, in the printing plate copy, in the rubber blanket, in the pressure application, in the rolling of the printing press and also due to mackling in the case of multi-color offset printing, necessitates supervision or control by measuring the screen tone density so as to afford the possibility of taking steps to optimize the printing process on the basis of the measured test values.

The test and control strips printed on the printed product are an essential component of known control systems. Since space on the printed product is tightly dimensioned and expensive, these test or control strips must, on the one hand, provide the greatest possible number of measurable information details as to full tone ink density, screen tone values, rolling, ink acceptance and the like, upon the smallest possible surface. On the other hand, however, the same test or control fields must also have a minimum size because a predetermined test spot diameter is required in order to test the integral density of a screen test field by means of a densitometer and to obtain a representative test value.

Among the heretofore known test methods, in most cases, only the screen tone values and full tone ink density values are evaluated from the test or control strips. Statements or information as to the increase in the print due to slip and/or mackling or mackle are, in most cases, provided only on the basis of visual assessment or judgment of corresponding line screen fields. In the case of the heretofore known test methods, no conclusions as to percentage value and direction of the slip and/or mackling are drawn from the test strips.

It is accordingly an object of the invention to provide a test method of the foregoing type, and apparatus for performing the method wherein, not only variations with respect to tone value reproduction, but also variations in the printed image due to slip and/or mackling are evaluated or determined with respect to magnitude and direction and are directly usable for corrections on the printing machine.

With the foregoing and other objects in view, there is provided, in accordance with the invention, a method of evaluating faults on printed sheets by means of a reflectance meter and test fields which comprises detecting by a measuring technique reflectance values of four test fields one of which is a full tone field and the other three are line screen test fields having screen lines disposed at varying angles yet exhibiting equal screen width and equal screen tone values in the film, mathematically determining the screen tone value in a print, deducting any effect of slip and mackling from the measured four reflectance values or from the screen tone values in the three line screen test fields ascertainable therefrom, and selectively indicating these values.

In accordance with another mode of the method of the invention, there is approximately determined a percentage magnitude of slip and mackling as a difference between maximal screen tone value determined in one of the three line screen test fields and the screen tone value determined in the print.

In accordance with a further mode of the method according to the invention, the percentage value of slip and mackling is precisely determined by mathematically combining the four measured reflectance values or the screen tone values in the three line screen test fields determinable therefrom while simultanelusly determining slip or mackling direction angle.

With such a method according to the invention, both the screen tone values as well as slip and/or mackling faults can be evaluated rapidly with minimal technical expense and can be corrected by an appropriate intervention in the printing operation, with the result that a very high incidence of spoilage and additional shutdown time for the printing machine can be avoided, and a high printing quality can be attained throughout the entire run.

In accordance with the apparatus for performing the method of evaluating faults on printed sheets and webs according to the invention, four test fields are provided combined into a test field block upon a sheet or web being tested, one of the test fields being a full tone field and the other three being line screen test fields having different screen angles. Also provided are reflectance meter means for measuring the test fields, computer means for processing measured reflectance values fed thereto from the reflectance meter, and indicating means for indicating values calculated in the computer means.

In accordance with another feature of the invention, the apparatus includes an additional line screen field in the test field block, the additional line screen field having a width smaller than that of the first-mentioned three line screen test fields and being disposed between two of the three line screen test fields.

In accordance with a further feature of the apparatus of the invention, the three line screen test fields have respective screen angles differing equally from one another by 120°.

In accordance with an added feature of the apparatus according to the invention, the lines of one of the three line screen test fields extend parallel to a front edge of the sheet as disposed for performance of the method thereon in the apparatus.

In accordance with a concomitant feature of the invention, the indicating means comprise an instrument for indicating percentage value of at least one of the slip and mackling, preselective tolerances having been taken into consideration.

A special advantage of this apparatus is that not only faults in the tone value reproduction but also slip and/or mackling faults can be evaluated in a simple and precise manner by means of a single reflectance meter.

Other features which are considered as characteristic for the invention are set forth in the appended claims.

Although the invention is illustrated and described herein as embodied in a test method for evaluating faults on printed sheets and webs and apparatus for performing the method, it is nevertheless not intended to be limited to the details shown, since various modifications and structural changes may be made therein without departing from the spirit of the invention and within the scope and range of equivalents of the claims.

Figure 2:
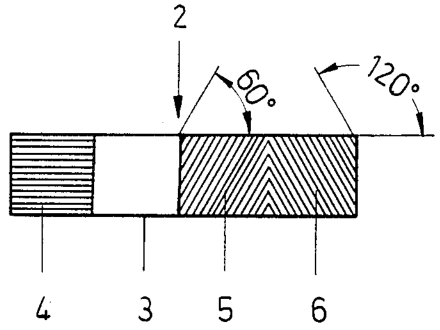
Figure 3:
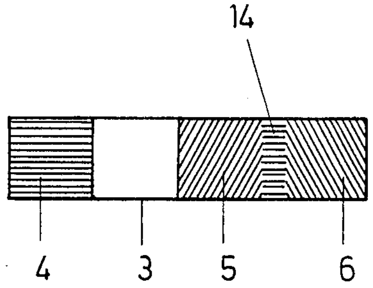
Figure 4:
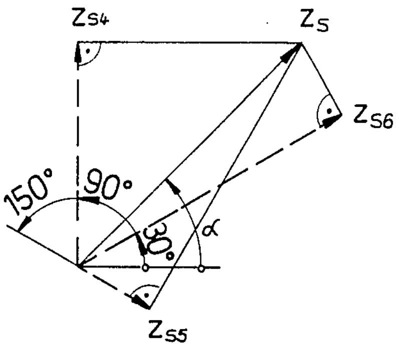

The construction and method of operation of the invention, however, together with additional objects and advantages thereof will be best understood from the following description of specific embodiments when read in connection with the accompanying drawings, in which:

FIG. 1 is a diagrammatic plan view of an apparatus for performing the method according to the invention, FIG. 2 is a greatly enlarged fragmentary view of FIG. 1 showing a basic version of a test field block thereof, FIG. 3 is a view of an extended or widened embodiment of the test field block according to FIG. 2; and FIG. 4 is a vectorial representation of the increase in screen tone values in a print due to slip and/or mackling in three line screen test fields of the test field block.

Referring now to the drawing and first, particularly, to FIG. 1 thereof, there is shown a test field block 2 which is printed at the start of printing operation on a sheet 1. The test field block 2 is subdivided into four individual test fields, of which one is formed as a full tone test field 3 and the other three as line screen test fields 4, 5 and 6. The screen lines of the line screen test field 4 are aligned parallel to the front edge of the sheet 1. The screen lines of the line screen test field 5 are oriented at an angle of 60° and the screen lines of the line screen test field 6 are oriented at an angle of 120°, respectively, with reference to the screen lines of the line screen test field 4.

Accordingly, the screen lines of the three line screen test fields 4, 5 and 6 have equal angular differences among themselves of 120°, respectively. They also have minimally required dimensions for a densitometric measurement.

The line screen test fields 4, 5 and 6 have a disadvantage, when compared to far more frequently used dot screen fields, in that the additional percentage fraction of a possible slip or shift in the screen tone value increase in the print can be detected and calculated by measuring techniques. The choice of three such line screen fields 4, 5 and 6 with screen lines having equal differences of angular inclination, respectively among themselves also permits the use of especially simple calculation formulas.

Due to the disposition of a further line screen field 14 between the two line screen test fields 5 and 6 in an extended or widened embodiment of the test field block 2, the printer is afforded the possibility of effecting an additional visual check or control of the printed product with respect to slip of the print. The line screen field 14 is made smaller in width than the remaining test fields 4 to 6, and the screen lines of the line screen field 14 are aligned parallel to the front edge of the sheet 1 like those of the line screen test field 4. For a visual check or control the line screen field 14 is used in conjunction with the two line screen test fields 5 and 6 adjacent thereto, a judgment as to whether slip of the print exists resulting from a general observation of the line screen test fields 5, 6, 14 and the impression derived therefrom of a possible widening of the lines in one or more of the line screen (test) fields 5, 6 and 14.

The test field block 2 is suitable for evaluating the following parameters:

1. Ink density in full tone $= D_V$
2. Screen tone value in the print including slip and/or mackling $= F(\%)$
3. Screen tone value in the print without slip and/or mackling $= F_D(\%)$
4. Screen tone value increase in the print without slip and/or mackling $= Z_D(\%)$
5. Screen tone value increase in the print due to slip and/or mackling $= Z_S(\%)$
6. Slip and/or mackling direction angle $\alpha$ according to FIG. 4.

In order to measure the test fields 3 to 6 of the test field block 2 by means of a reflectance meter, the sheet 1 of the exemplary embodiment is placed upon a test bench 7. Any freely movable densitometer 8 which may be positioned selectively at any desired location of the sheet 1 may be used as the reflectance meter. In the exemplary embodiment, the densitometer 8 is disposed in a test beam 9 so as to be slidable across the entire width of the sheet 1. The test beam 9 is, in turn, slidable above the sheet 1 along the entire length of the test bench 7 on two lateral guides or slideways 10, so that any desired location of the sheet 1 can be measured with the densitometer 8.

Obviously, the test beam 9 may also be equipped with a greater number of densitometers 8 for simultaneously measuring the test fields 3 to 6 of a plurality of test field blocks 2. The densitometers may be suitably disposed so as to be stationary or movable.

In the exemplary embodiment, a computer 11 for combining the measured reflectance values is provided with a feed-in and read-out keyboard 12 and with an indicating device or display 13 on the left-hand side of the test bench 7.

Since, as is generally known, one full tone measurement and one screen tone measurement are required in order to form a screen tone value, the reflectance values of the full tone test field 3 as well as of the three line screen test fields 4, 5 and 6 are measured by means of the densitometer 8, in a first step of the method according to the invention, in order to evaluate the test field block 2. Three screen tone values are obtained thereby in addition to the full tone density.

Two possible modes of mathematical evaluation having different degrees of complexity are then available for selection. According to a first possible mode of evaluation, the screen tone value increase in the print due to slip and/or mackling $Z_S$ and the direction angle $\alpha$ are not calculated, but rather only the screen tone value in the print $F_D$ (slip and/or mackling eliminated) is calculated.

The exact method of determining the screen tone value in the print $F_D$ then proceeds in the following manner.

The screen tone value in the print $F_D$ (slip and/or mackling eliminated) is equal to the sum of the determined screen tone values F (with slip and/or mackling) of those two fields having the lower values, less the determined screen tone value F (with slip and/or mackling) of the third field i.e. that having the highest value.

In a second possible mode of evaluation, in addition to the calculation of the hereinafore mentioned screen tone value in the print $F_D$ (slip and/or mackling eliminated), the screen tone value increase in the print due to slip and/or mackling $Z_S$ is also calculated by means of the computer 11 and communicated to the operator through the indicating device 13 of the computer 11.

Whether slip and/or mackling is present, follows from a comparison of the three calculated screen tone values in the print F. The slip and/or mackling directions in the three ranges $\alpha=0°$ to 60°, 60° to 120° and 120° to 180°, as well as the special cases, $\alpha=0°$, 30°, 60°, 90°, 120° and 150°, can be indicated.

By an approximation method, the screen tone value increase due to slip and/or mackling $Z_S$ is approximately equal to the determined screen tone value F of that field having the highest value, less the previously determined screen tone value $F_D$ (slip and mackling eliminated) in the print.

The screen tone value increase due to slip and/or mackling $Z_{S4}$, $Z_{S5}$ and $Z_{S6}$ is a function of the respective slip angle in the individual line screen test fields 4, 5 and 6; this, however, was disregarded in the foregoing approximation method. Accordingly, the slip angle must also be evaluated and included in the calculation for a precise determination of the screen tone value increase due to slip and/or mackling $Z_S$.

FIG. 4 illustrates vectorially the screen tone value increase in the print due to slip and/or mackling $Z_{S4}$, $Z_{S5}$ and $Z_{S6}$ in the three line screen test fields 4, 5 and 6. The dependence thereof upon the slip angle $\alpha$ is also readily apparent.

The starting base for the precise evaluation of the screen tone value increase in the print due to slip and/or mackling $Z_S$ is that the screen tone value of a screen test field is composed of the sum of the known screen tone value in the film $F_F$, the screen tone value increase in the print without slip and/or mackling $Z_D$ and the screen tone value increase in the print due to slip and/or mackle $Z_S$, both the screen tone value increase in the print without slip and/or mackling $Z_D$ and the screen tone value increase in the print due to slip and/or mackling $Z_S$ being unknown and $Z_S$ being, moveover, a function of the slip direction $\alpha$. Thus, in order to determine the three unknowns $Z_D$, $Z_S$ and $\alpha$, three equations are required, which also, in turn, presuppose three screen tone test values F (including slip and/or mackling) which are ascertained analogously from the three line screen test fields 4, 5 and 6.

According to the trigonometric relationships between the vectors $Z_S$, $Z_{S4}$, $Z_{S5}$ and $Z_{S6}$ in FIG. 4, the following holds true for the line screen test field 4:

$$Z_{S4}=Z_S \cdot \sin\alpha$$

Furthermore, as hereinbefore described:

$$F=F_F+Z_D+Z_S$$

and $$F_D=F_F+Z_D,$$

therefore also $$F=F_D+Z_S,$$

and referred to the line screen test field 4, $$F_4=F_D+Z_{S4}$$

The formulas for the other two line screen test fields 5 and 6 may be drawn up analogously with the foregoing.

The slip angle $\alpha$ of the vector $Z_S$ shown in FIG. 4 can lie between 0° and 360°, depending upon whether the impression or print slips and/or mackles forwards or backwards with reference to the direction of travel of the printed material or precisely parallel thereto. But since the densitometer 8 cannot establish or make any statement as to whether the screen tone value increase due to slip and/or mackling $Z_S$ lies to the front or to the rear and to the right or to the left, but can only indicate absolute values independent of direction, three calculation regions for which different equations are valid are obtained analogously to the three line screen test fields. Accordingly, a statement can be made only as to the angle of the line of application of slip and/or mackling, for which the initial equations, after appropriate conversion, are fed into the computer 11 as a computing program.

If the highest screen tone value F is measured, for example, in the line screen test field 6, then the angle of the line of application of the slip and/or mackling definitely lies between $\alpha>0°$ and $\alpha<60°$. By trigonometric conversion of the afore-described equations, a precise value is obtained for $$\alpha = \arctan \frac{\frac{1}{2}\sqrt{3}}{\frac{F_6 - F_4}{F_6 - F_5} + 0.5}$$

The precise increase due to slip and/or mackling $Z_S$ evaluated with the aid of the slip angle $\alpha$ is then calculated from $$Z_S = \frac{F_6 - F_5}{\sin\alpha}$$

The equations for the regions two and three are obtained analogously to those for the first region.

The value for the screen tone value increase in the print due to slip and/or mackling $Z_S$, for the slip angle $\alpha$ and for the screen tone values in the print $F_D$ (slip and/or mackling eliminated) which are calculated by the computer 11 in the foregoing manner can be made visible in the indicating device 13 upon command through the feed-in and read-out keyboard 12 or through an indication program of the computer 11, so that an immediate corrective intervention in the printing operation is thereby afforded. Naturally, this method may be employed individually for the different colors of a multicolor printing operation.

There is claimed:

1. Method of evaluating faults on printed sheets which comprises:
   - printing four test fields one of which is a full tone field and the other three are line screen test fields having screen lines disposed at varying angles yet exhibiting equal screen width and equal screen tone values in an ink film from which the test fields are printed,
   - detecting reflectance values of the test fields by a measuring technique,
   - mathematically determining the screen tone value in a print, deducting any effect of slip and mackling from the measured four reflectance values or from the screen tone values in the three line screen test fields ascertainable therefrom; and selectively indicating these values.

2. Method according to claim 1 which comprises approximately determining percentage magnitude of slip and mackling as a difference between maximal screen tone value determined in one of the three line screen test fields and the screen tone value determined in the print.

3. Method according to claim 1 which comprises precisely determining the percentage value of slip and mackling by mathematically combining the four measured reflectance values or the screen tone values in the three line screen test fields determinable therefrom while simultaneously determining slip or mackling direction angle.

4. Apparatus for evaluating faults on printed sheets and webs comprising four test fields combined into a test field block upon a sheet or web being tested, one of said test fields being a full tone field and the other three being line screen test fields having different screen angles, reflectance meter means for measuring the test fields, computer means for processing measured reflectance values fed thereto from said reflectance meter, and indicating means for indicating values calculated in said computer means.

5. Apparatus according to claim 4 including an additional line screen field in said test field block, said additional line screen field having a width smaller than that of said first-mentioned three line screen test fields and being disposed between two of said three line screen test fields.

6. Apparatus according to claim 4 wherein said three line screen test fields have respective screen angles differing equally from one another by 120°.

7. Apparatus according to claim 4 wherein the lines of one of said three line screen test fields extend parallel to a front edge of the sheet as disposed for performance of the method thereon in the apparatus.

8. Apparatus according to claim 4 wherein said indicating means comprise an instrument for indicating percentage value of at least one of slip and mackling, preselective tolerances having been taken into consideration.

9. Apparatus according to claim 4 wherein at least one of the screen angles included by the screen lines of the three line screen test fields is within a range of angles of greater than 90° to 60°.

10. Method according to claim 3 wherein the screen tone value in the print, with any effect of slip and mackling deducted therefrom, is exactly equal to the sum of the determined screen tone value, with any effect of slip and mackling included therein, of the two line screen test fields having the lowest values of the three line screen test fields, minus the determined screen tone value, with any effect of slip and mackling included therein, of the third line screen test field having the highest value of the three line screen test fields.

11. Method according to claim 3 wherein, in an approximation method, an increase in screen tone value due to the effect of slip and mackling is substantially equal to the determined screen tone value of that line screen test field having the highest value minus the previously determined screen tone value in the print, with any effect of slip and mackling excluded therefrom.

* * * * *